(12) United States Patent
Hsu

(10) Patent No.: US 6,357,079 B1
(45) Date of Patent: Mar. 19, 2002

(54) SLIDE GROOVE FIXING DEVICE FOR USE WITH CURTAINS

(75) Inventor: Pey-Son Hsu, Changhua Hsien (TW)

(73) Assignee: Ching Feng Blinds Ind. Co., Ltd., Changhua (TW)

( * ) Notice: Subject to any disclaimer, the term of this patent is extended or adjusted under 35 U.S.C. 154(b) by 0 days.

(21) Appl. No.: 09/635,357

(22) Filed: Aug. 9, 2000

(51) Int. Cl.$^7$ .................................................. E05D 3/02
(52) U.S. Cl. ..................................... 16/87 R; 248/262
(58) Field of Search ........................... 16/87 R, 87.4 R, 16/96 R, 94 R; 248/262, 264, 265, 227.4, 231.41, 214, 251

(56) References Cited

U.S. PATENT DOCUMENTS

| | | | | |
|---|---|---|---|---|
| 2,524,711 A | * | 10/1950 | Nelson | 248/264 |
| 5,186,426 A | * | 2/1993 | Wada | 16/94 R |
| 5,398,902 A | * | 3/1995 | Crowe | 16/94 R |
| 5,667,178 A | * | 9/1997 | Yang | 248/262 |
| 6,186,457 B1 | * | 2/2001 | Carter | 248/251 |

* cited by examiner

Primary Examiner—Lynne Browne
Assistant Examiner—Doug Hutton
(74) Attorney, Agent, or Firm—Bacon & Thomas

(57) ABSTRACT

An improved slide groove fixing device for use of curtains has a single-track slide body, a movable abutting seat, a transversely U-shaped clamping seat, a supporting spiral member, and an adjusting bolt. The movable abutting seat, having elongated sliding slots matching to sliding plates disposed at the U-shaped clamping seat thereon, is inserted into the interior of the transversely U-shaped clamping seat, guided into position via said sliding slots thereof being led vertically through the sliding plates thereof and located into position via the supporting spiral member being abutted against an inner-thread adjusting hole of the movable adjusting seat and a through hole of a smaller bottom plate of the U-shaped clamping seat at both ends, before the U-shaped fixing clamping seat engaged with the movable abutting seat is installed onto the single-track slide body so as to clamp directly and easily a curtain sandwiched between the bottom surface of the single-track slide body and the smaller bottom plate of the U-shaped fixing clamping seat; in addition, via the adjusting bolt, the movable abutting seat can be adjusted upwards or downwards at the interior of the U-shaped clamping seat so as to facilitate the attachment of curtains of different thickness tightly onto the single-track slide body without chance of coming off easily.

2 Claims, 4 Drawing Sheets

SLIDE GROOVE FIXING DEVICE FOR USE WITH CURTAINS

BACKGROUND OF THE INVENTION

The present invention is related to an improved slide groove fixing device for use of curtains, comprising a single-track slide body, a movable abutting seat, a transversely U-shaped clamping seat, a supporting spiral member, and an adjusting bolt wherein the movable abutting seat is inserted into the interior of the transversely U-shaped fixing clamping seat and then located into position via the supporting spiral member before said U-shaped clamping seat engaged with said movable abutting seat is installed onto said single-track slide body so as to secure directly a curtain sandwiched between the bottom surface of said single-track slide body and a smaller bottom plate of said U-shaped clamping seat. Via the adjusting bolt, said movable abutting seat can be adjusted upwards or downwards at the interior of said U-shaped clamping seat so as to facilitate the attachment of said curtain tightly onto said single-track slide body.

Please refer to FIG. 1. A conventional sliding groove fixing device for curtains as shown in FIG. I is mainly made up of a single-track sliding body 10, a locating seat 20, a clamping seat 30 wherein the single-track sliding body 10 is defined by an oblong trough 11 at the top surface; the locating seat 20 is indented into a U-shaped plate 21 at the top surface and provided with a fastening wall 22 extending downwards for a proper length at one lateral side, two corresponding indented L-shaped guiding columns 221 disposed at both lateral sides of said fastening wall 22, two elongated oval slots 222 disposed between said indented L-shaped guiding columns 221 at said fastening wall 22, and a fastening plate 223 disposed at the lower section said elongated oval slots, bent in a right angle and extending inwards for a proper length with a thread hole 224 disposed at the middle thereon. The clamping seat 30 is an L-shaped device, having a stop plate 31 disposed at the bottom, two corresponding sliding tracks 32 each defined by a flange bent in an arch and extending backwards from the lateral side of the vertical plate of said clamping seat 30, and a fixing plate 33 bent in a right angle from the vertical plate thereof with a screw hole 34 disposed thereon.

Please refer to FIGS. 2, 3. In assembly, screws are applied, passing through the elongated oval slots 222 of the locating seat 20 to fix said locating seat 20 onto the lateral side of a window frame. The single-track sliding body 10 is then joined to the bottom side of the locating seat 20 with the oblong trough 11 thereof matching to the indented U-shaped plate 21 thereof. A wooden block 40 with a curtain 90 sandwiched therein is applied to be abutted against the bottom surface of said single-track sliding body 10. The L-shaped clamping seat 30 is then joined to the locating seat 20 with the sliding tracks 32 thereof led through the indented L-shaped guiding columns 221 thereof. Via a screw led through and screwed up the screw hole 34 of the fixing plate 33 thereof and the thread hole 224 of the fastening plate 223 thereof, the clamping seat 30 is securely attached to the locating seat 20 with the wooden block 40 and the curtain 90 sandwiched therein abutted tightly between the stop plate 31 of the clamping seat 30 and the bottom surface of the single-track sliding body 10 as shown in FIG. 3.

However, there are several drawbacks to this conventional slide groove fixing device for curtains. First, the structure of said locating seat 20 and said L-shaped clamping seat 30, especially the fastening plate 223 thereof and the fixing plate 33 thereof, is rather complicated, which enhance not only the difficulty of production, but also the time of processing. Second, the curtain 90 is attached to said single-track sliding body 10 and said L-shaped clamping seat 30 via said wooden block 40. In case of curtains of different thickness, the thickness of said wooden block 40 also has to be adjusted accordingly so as to clamp the curtain 90 securely onto said single-track sliding body 10. It is not only inconvenient, but also greatly reduce its applicability in practical uses. Third, through the mediation of said wooden block 40, said curtain 90 is fixed onto the engaged locating seat 20 and clamping seat 30. The clamping force, however, is easily dispersed by said wooden block 40, and thus losing its effectiveness in use. Consequently, the curtain may easily come off when pulled.

SUMMARY OF THE PRESENT INVENTION

It is, therefore, the primary object of the present invention to provide an improved slide groove fixing device for use of curtains, comprising a single-track slide body, a movable abutting seat, a transversely U-shaped clamping seat, a supporting spiral member, and an adjusting bolt wherein the movable abutting seat having an inner-thread adjusting hole and the transversely U-shaped clamping seat having a through hole are integrally molded and economically designed in structure so as to boost the efficiency of production and save the time of processing.

It is another object of the present invention to provide an improved slide groove fixing device for use of curtains wherein the curtain is directly abutted against the single-track slide body through the clamping force of said transversely U-shaped clamping seat engaged with said movable abutting seat without the mediation of said wooden block of a conventional device so that curtains of different thickness can be easily and quickly fixed onto said single-track slide body.

It is a third object of the present invention to provide an improved slide groove fixing device wherein said adjusting bolt can securely facilitate the engagement of said movable abutting seat and said transversely U-shaped clamping seat, thus enhancing the clamping force for fixing said curtain directly onto said single-track slide body without the danger of coming off easily.

It is a fourth object of the present invention to provide an improved slide groove fixing device wherein said supporting spiral member is applied to locate said movable abutting seat into position at the interior of said transversely U-shaped clamping seat before the engaged movable abutting seat and U-shaped clamping seat are installed onto said single-track slide body for easy assembly and economy of the time for assembly.

It is a fifth object of the present invention to provide an improved slide groove fixing device wherein said movable abutting seat located into position by said supporting spiral member will not fall from its location so that the users can be prevented from putting said single-track slide body into wrong place when in assembly.

DETAILED DESCRIPTION OF THE PREFERRED EMBODIMENTS

Figure 4:
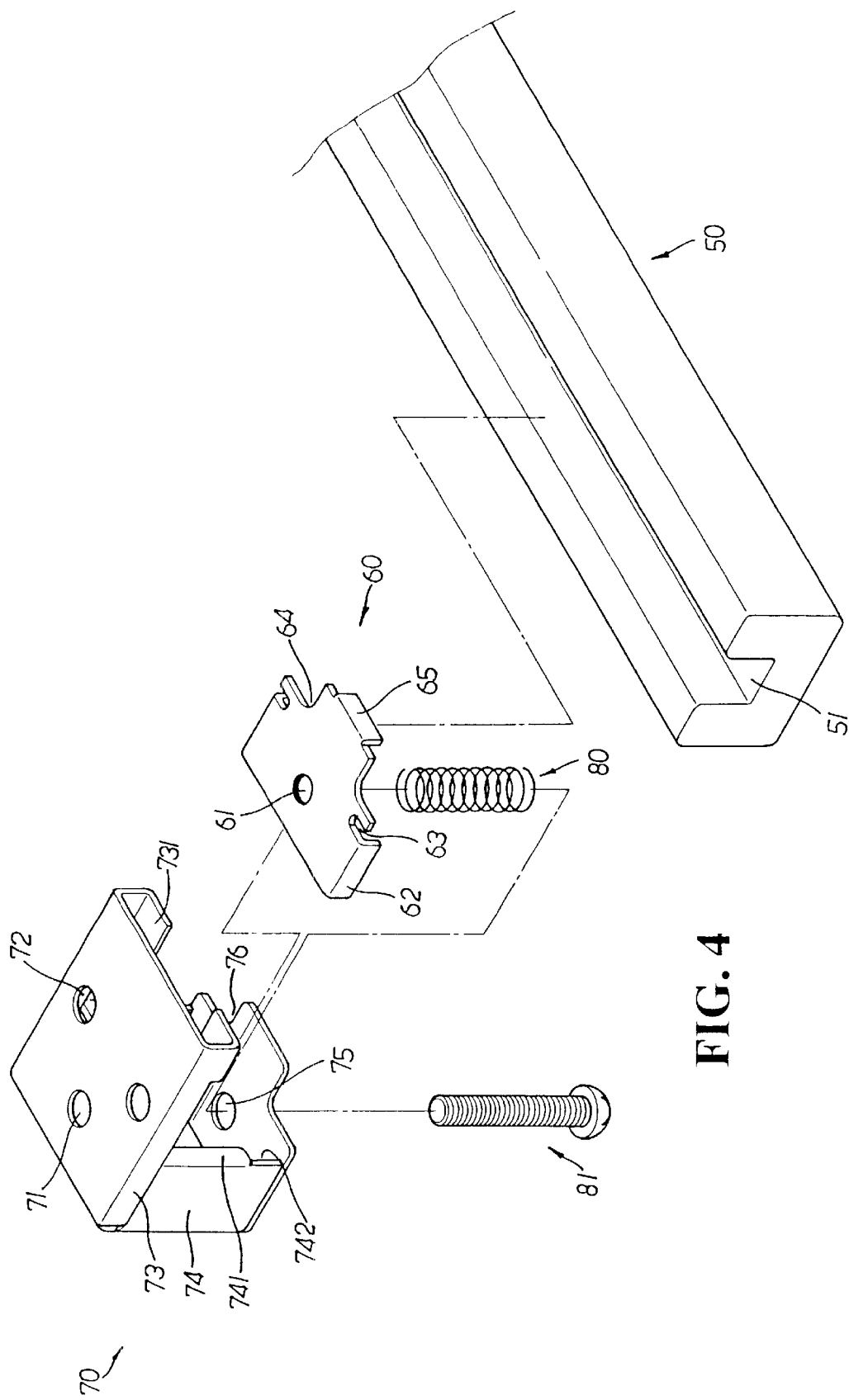
FIG. 4 is a perspective exploded view of the present invention.

Please refer to FIG. 4. The present invention is related to an improved slide groove fixing device for use of curtains, comprising a single-track sliding body 50, a movable abutting seat 60, a transversely U-shaped clamping seat 70, a supporting spiral member 80, and an adjusting bolt 81. The single-track sliding body 50 is formed a rectangular column with a trough 51 defining at the top surface thereof. The movable abutting seat 60, a rectangular plate, is provided with an inner-thread adjusting hole 61 disposed at the top surface, fending flanges 62 integrally molded and extending downwards for a proper length at both lateral sides thereof, sliding slots 63 each defining inwards an elongated oval arch adjacent to said fending flanges 62 respectively, escape arch grooves 64 disposed in front of said sliding slots 63, and a hook plate 65 integrally molded and extending downwards for a proper length at the front middle edge of said movable abutting seat 60. The transversely U-shaped clamping seat 70 is made up of larger top plate and a smaller bottom plate with two vertical fending walls 74 sandwiched therebetween. The larger top plate of the U-shaped clamping seat 70 is provided with a through hole 71 disposed at the rear thereof and several fixing holes 72 disposed in front of said through hole 71 thereof; two stop flanges 73 integrally molded and extending downwards for a proper length at both lateral sides thereof and two abutting plates 731 each bent in a right angle and extended inwards for a proper length at the front of each said stop flange 73 thereof. The two vertical fending walls 74 thereof, integrally molded and sandwiched between both said larger top plate and smaller bottom plate thereof, has two sliding plates 741 disposed at the upper section of both front vertical lateral sides, each bent in a right angle and extending inwards for a proper length, and two inserting grooves 742 disposed at the lower section adjacent to said sliding plates 741 thereof. The smaller bottom plate thereof is provided with a through hole 75 disposed at the rear surface thereof corresponding to the through hole 71 of said larger top plate thereof, and two big escape arches 76 defining at both front edges thereof The supporting spiral member 80 is a flexible and hollow cylindrical column with a diameter slightly larger than that of said inner-thread adjusting hole 61 thereof and said through hole 75 thereof Please refer to FIG. 5. In assembly, the movable abutting seat 60 is transversely moved backwards to be inserted into the interior of the U-shaped clamping seat 70. Via the inserting grooves 742, the fending flanges 62 thereof is led through and joined to the lower section of the sliding plates 741 to be located inside the vertical fending walls 74. Then via the sliding plates 741 matching to the elongated sliding slots 63 thereof, the movable abutting seat 60 can be adjusted vertically upwards into a proper position. The supporting spiral member 80 is then applied to the interior of the engaged movable abutting seat 60 and the U-shaped clamping seat 70 to be abutted against the inner-thread adjusting hole 61 thereof and the through hole 75 thereof at both ends so as to locate said movable abutting seat 60 into position. The adjusting bolt 81 is then led through the through hole 75 thereof, passing through the hollow cylindrical column of the supporting spiral member 80 to be screwed up to the inner thread of the adjusting hole 61 thereof Through the movement of letting loose or tightening up, the adjusting bolt 81 can activate the movable abutting seat 60 to move upwards or downwards into a proper position.

Figure 1:
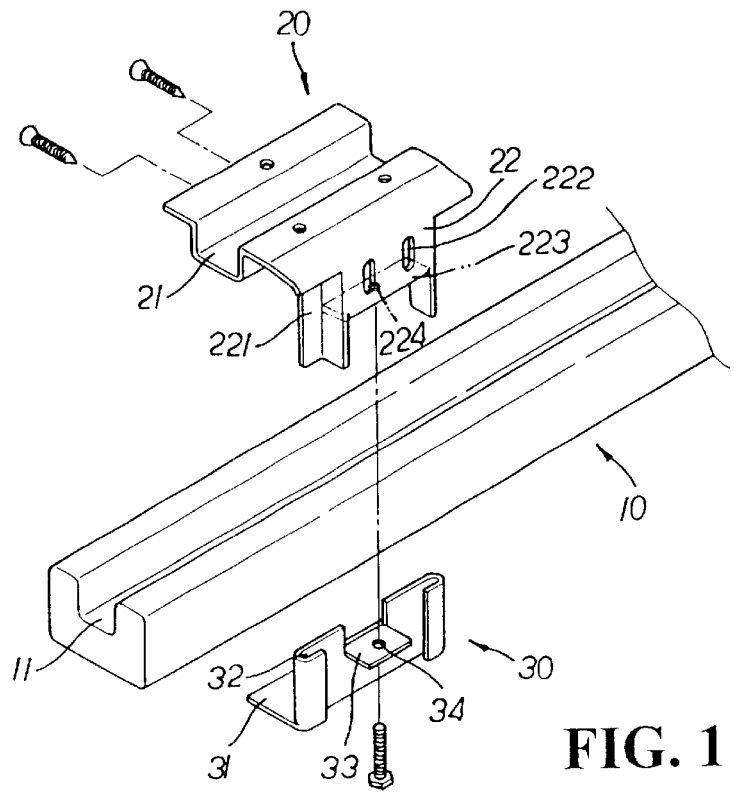
FIG. 1 is a perspective exploded view of a conventional slide groove fixing device for use of curtains.
Figure 2:
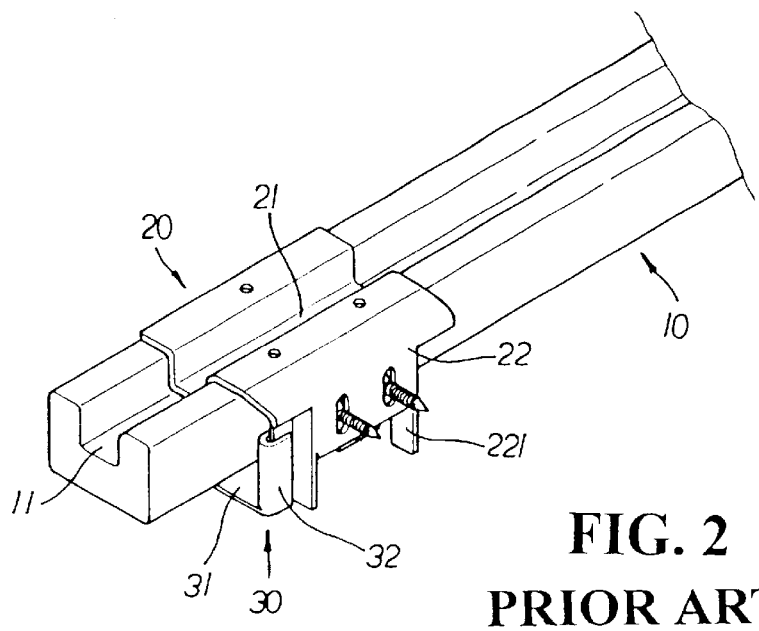
FIG. 2 is a perspective assembled view of a conventional slide groove fixing device.
Figure 6:
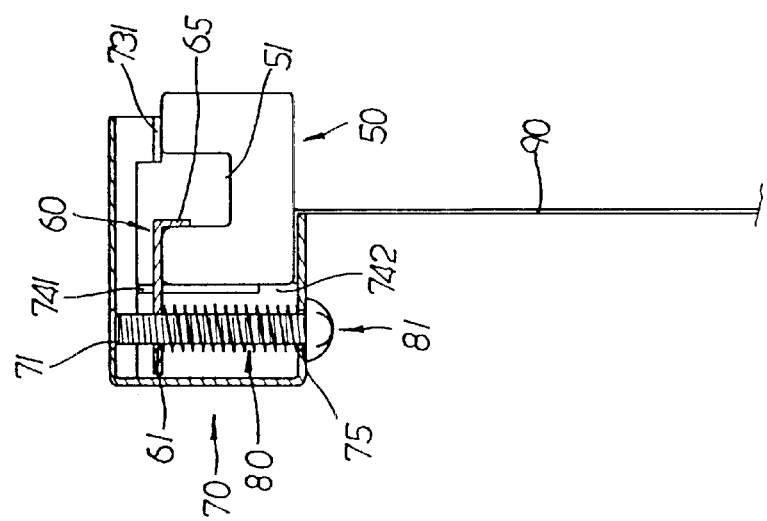
FIG. 6 is a cross sectional view of the present invention in practical use.
Figure 3:
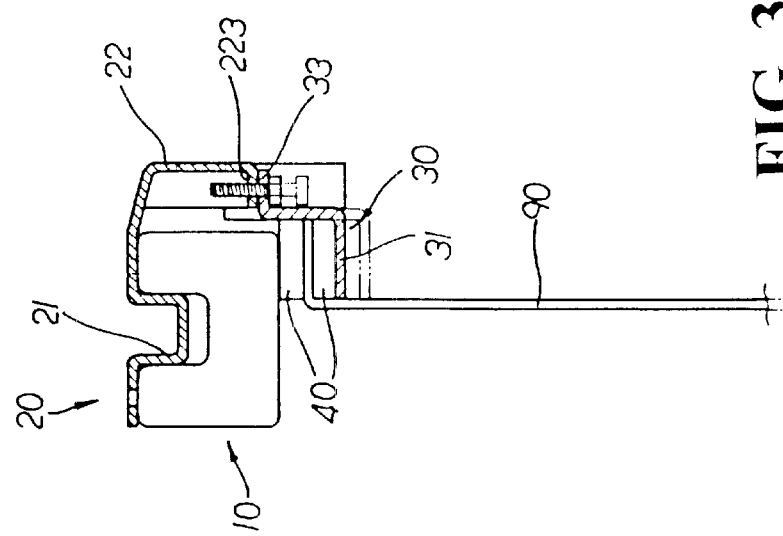
FIG. 3 is a cross sectional view of a conventional slide groove fixing device in practical use.
Figure 5:
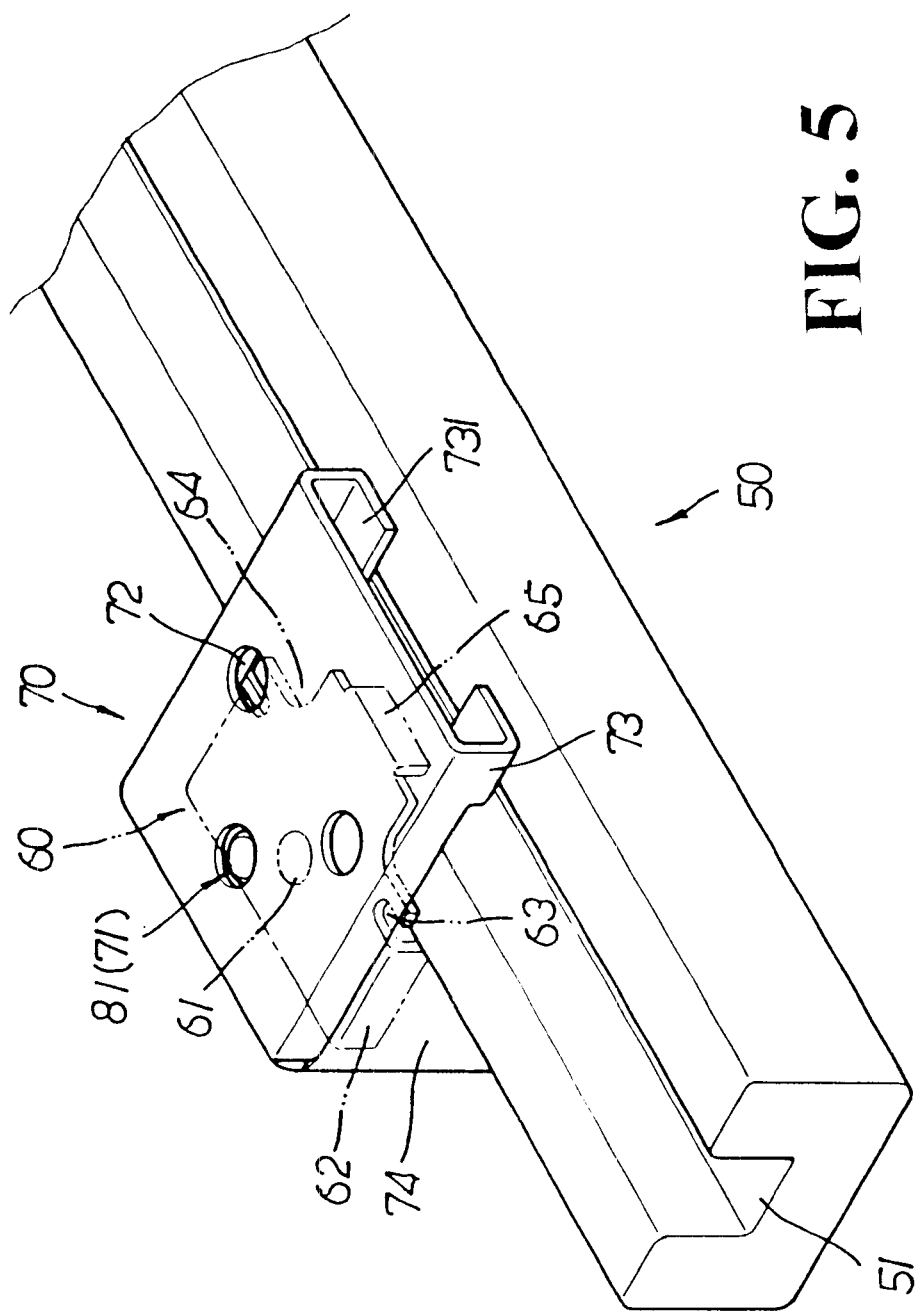
FIG. 5 is a perspective assembled view of the present invention.

Please refer to FIGS. 5, and 6. To complete the assembly, the engaged movable abutting seat 60 and the U-shaped clamping seat 70 are installed onto the single-track sliding body 50 as shown in FIG. 5. The U-shaped clamping seat 70 with the movable adjusting seat 60 adjusted into a proper height is led transversely and clamped onto the single-track sliding body 50, with the larger top plate thereof overpassing the top surface trough 51 thereof The hook plate 65 of the movable abutting seat 60 is hooked onto one upper edge of said trough 51, and the abutting plates 731 of the U-shaped clamping seat 70 are abutted against the top surface disposed at the other side of said trough 51. A curtain 90 can be applied and sandwiched between the bottom surface of the single-track sliding body 50 and the smaller bottom plate of the U-shaped clamping seat 70. Via the adjustment of the adjusting bolt 81, the curtain 90 can be tightly secured into place between said single-track sliding body 50 and said U-shaped clamping seat 70 as shown in the cross sectional view of the present invention in FIG. 6.

There are several benefits to the present invention. First, the adjusting hole 61 of the movable adjusting seat 60 and the through hole 71 of the U-shaped clamping seat 70 are integrally molded. No other parts are required for their assembly. It's economic in design and easy and quick in production. Second, the curtain 90 is directly clamped between the single-track sliding body 50 and the U-shaped clamping seat 70. Without the mediation of a wooden block, curtains of different thickness can be easily and quickly attached to the single-track sliding body 50 via the clamping force of the engaged movable abutting seat 60 and the U-shaped clamping seat 70. It's not only convenient, but also greatly boost the use of the present invention for different kinds of curtain. Third, with no wooden block to disperse the clamping force, the curtain 90 can be securely attached without the danger of coming off. Fourth, the supporting spiral member 80 can effectively support the movable abutting seat 60 so that said movable abutting seat 60 can be easily adjusted into position before installed onto said single-track sliding body 50, greatly reducing the time of assembly. Fifth, the pre-location of the movable abutting seat 60 can prevent the users from putting the single-track sliding body 50 into wrong place when in assembly.

What is claimed is:

1. A slide groove fixing device for use with curtains, comprising:
   a single-track sliding body having a rectangular column with a trough on a top surface;
   a movable abutting seat including a rectangular plate having:
      an inner-thread adjusting hole on a top surface, fending flanges integrally molded to the rectangular plate and extending downwards at both lateral sides;
      sliding slots, each slot defining inwards an elongated oval arch adjacent to said fending flanges,
      escape arch grooves disposed in front of said sliding slots, and
      a hook plate integrally molded to the rectangular plate and extending downwards at a front middle edge of said movable abutting seat;
   a transversely U-shaped clamping seat including a top plate, two vertical fending walls and a bottom plate;

said top plate having:
  a through hole disposed at a rear of the top plate and a plurality of fixing holes disposed in front of said through hole,
  two stop flanges integrally molded to the top plate and extending downwards at lateral sides of the top plate, and
  two abutting plates, each plate bent at a right angle and extending inwards at a front of said stop flanges;
said two vertical fending walls being integrally molded to the top plate and located between the top plate and the bottom plate, each fending wall having:
  a sliding plate bent at a right angle and extending inwards at an upper section of the front vertical lateral side of the fending wall, said sliding plate being adjacent to an inserting groove disposed at a lower section of the fending wall;
said bottom plate having:
  a through hole disposed at a rear surface, said through hole corresponding to the through hole in the top plate, and
  two escape arches at the front edge;
a supporting spiral member, said spiral member being a flexible and hollow cylindrical column with a diameter slightly larger than that of the inner-thread adjusting hole of said movable abutting seat and the through hole of said bottom plate; and
an adjusting bolt;
whereby, in assembly, said movable abutting seat is inserted into an interior of the U-shaped clamping seat, guided into position via the sliding slots and moved vertically up the sliding plates of the U-shaped clamping seat; said movable abutting seat is then located into position by the supporting spiral member being abutted against the inner-thread adjusting hole of the movable abutting seat and the through hole of the bottom plate; before the U-shaped fixing clamping seat engaged with the movable abutting seat is installed onto said single-track slide body, a curtain is placed between the bottom surface of said single-track slide body and said bottom plate of said U-shaped fixing clamping seat; via said adjusting bolt, the movable abutting seat can be adjusted upwards or downwards at the interior of the U-shaped clamping seat so as to secure curtains having different thickness tightly onto said single-track slide body with no danger of coming off easily.

2. The slide groove fixing device for curtains as claimed in claim 1, wherein said supporting spiral member can be either a compression spring or a flexible rubber tube.

* * * * *